United States Patent
Tsuchiya et al.

(10) Patent No.: US 7,342,436 B2
(45) Date of Patent: Mar. 11, 2008

(54) BIPOLAR SUPPLY VOLTAGE GENERATOR AND SEMICONDUCTOR DEVICE FOR SAME

(75) Inventors: Chikara Tsuchiya, Kawasaki (JP); Kimitoshi Niratsuka, Kawasaki (JP); Eiji Nishimori, Kaeasaki (JP); Katsuyoshi Otsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/316,901

(22) Filed: Dec. 12, 2002

(65) Prior Publication Data

US 2003/0117209 A1   Jun. 26, 2003

(30) Foreign Application Priority Data

Dec. 21, 2001   (JP) .............................. 2001-389201

(51) Int. Cl.
*G05F 1/10*   (2006.01)
(52) U.S. Cl. .................. 327/536; 327/537; 363/59
(58) Field of Classification Search .......... 327/536, 327/537; 363/59
See application file for complete search history.

(56) References Cited

U.S. PATENT DOCUMENTS

| 4,395,675 | A |   | 7/1983  | Toumani |   |
|---|---|---|---|---|---|
| 4,573,006 | A | * | 2/1986  | Newton | 323/326 |
| 4,578,630 | A | * | 3/1986  | Grosch | 323/271 |
| 5,059,887 | A | * | 10/1991 | Iida et al. | 323/222 |
| 6,002,603 | A | * | 12/1999 | Carver | 363/98 |
| 6,229,380 | B1 | * | 5/2001  | Hedberg | 327/536 |
| 6,434,028 | B1 | * | 8/2002  | Takeuchi et al. | 363/59 |
| 6,501,228 | B2 | * | 12/2002 | Peng | 315/169.3 |
| 6,504,351 | B2 | * | 1/2003  | Eagar et al. | 323/282 |

(Continued)

FOREIGN PATENT DOCUMENTS

DE   33 16 251 A   11/1984

(Continued)

OTHER PUBLICATIONS

"Active-Matrix Liquid Crystal Display (AMLCD) Supply," MAX1664, Maxim Integrated Products datasheets, pp. 1, 8 and 9 (Rev 0, Apr. 1998).

(Continued)

*Primary Examiner*—Quan Tra
*Assistant Examiner*—Khareem E. Almo
(74) *Attorney, Agent, or Firm*—Arent Fox, LLP

(57) ABSTRACT

A reduced-size bipolar supply voltage generator which produces a positive and negative voltages from a unipolar power source. A single inductor is employed for current switching operation, where electric energy supplied from a power source is stored in magnetic form, and the stored magnetic energy is released as electric energy. A first and second diodes are connected to first and second ends of the inductor, respectively. The inductor is grounded at the first end via a first switch, while its second end is connected to the power source via a second switch. A switching controller activates both switches to energize the inductor. It then deactivates the first switch alone, thus directing the inductor's energy to the positive voltage output through the first diode. The controller may turn off the second switch alone after energizing the inductor. The stored energy now appears at the negative voltage output through the second diode.

22 Claims, 13 Drawing Sheets

U.S. PATENT DOCUMENTS 6,538,494 B2 * 3/2003 Zimlich ...................... 327/537
2003/0052654 A1 * 3/2003 Kanakubo et al. .......... 323/222

FOREIGN PATENT DOCUMENTS

| EP | 0 655 826 A | 5/1995 |
|---|---|---|
| JP | 62089474 | 4/1987 |
| JP | 2000-287441 | 10/2000 |
| WO | WO 02/060043 | 8/2002 |

OTHER PUBLICATIONS

Translation of Abstract DE3316251A1, Robert Bosch GMBH, Nov. 8, 1984.
European Search Report dated Sep. 6, 2004 for EP 022518451.
"Active-Matrix Liquid Display (AMLCD) Supply", 1998, MAX1664, Maxim Integrated Products Datasheets, 16 pages, (REV 0,4/98).

* cited by examiner

US 7,342,436 B2

BIPOLAR SUPPLY VOLTAGE GENERATOR AND SEMICONDUCTOR DEVICE FOR SAME

CROSS-REFERENCE TO RELATED APPLICATIONS

This application is based on, and claims priority to, Japanese Application No. 2001-389201, filed Dec. 21, 2001, in Japan, and which is incorporated herein by reference.

BACKGROUND OF THE INVENTION

1. Field of the Invention

The present invention relates to a bipolar supply voltage generator and a semiconductor device for same. More particularly, the present invention relates to a bipolar supply voltage generator which produces a positive and negative supply voltages from a unipolar power source, as well as to a semiconductor device used in that bipolar supply voltage generator.

2. Description of the Related Art

Many of today's portable data processing devices, including mobile phones and personal digital/data assistants (PDAs), have a liquid crystal display (LCD). Since LCDs use both positive and negative voltages, those devices incorporate a bipolar power supply circuit that produces such voltages from a single-voltage power source such as secondary battery cells.

FIG. 12 shows a typical configuration of a conventional bipolar supply voltage generator. The illustrated circuit comprises the following components: an input capacitor Cin, pulse generators PG1 and PG2, inductors L1 and L2, switching transistors Q1 and Q2, diodes D1 and D2, and output capacitors C1 and C2. This circuit is supplied with a source voltage Vin of, for example, three volts from a lithium secondary battery.

The input capacitor Cin is inserted between the source voltage Vin and ground to reduce the output impedance of the power source in high frequencies. The first inductor L1 is a coil with an inductance of several tens to several hundreds of microhenries (µH). The first inductor L1 stores incoming electric energy in the form of magnetic fields, and it releases that magnetic energy as electric energy. The second inductor L2 is also a coil with a similar inductance.

The pulse generators PG1 and PG2 produce a first and second pulse signals to drive two switching transistors Q1 and Q2, respectively. The switching transistor Q1 is an n-channel metal oxide semiconductor-field effect transistor (MOSFET), and Q2 is a p-channel MOSFET. The first switching transistor Q1 turns on when the first pulse signal P1 becomes high, while it is otherwise in an off state. The second switching transistor Q2, on the other hand, turns on when the second pulse signal P2 becomes low, while it is otherwise in an off state.

The two diodes D1 and D2 serve as switches that become active when their anode has a higher voltage than their cathode (forward biased), while they are otherwise shut off. The first diode D1, when forward biased, allows a voltage developed across the first inductor L1 to appear at its cathode. Likewise, the second diode D2, when forward biased, allows a voltage developed across the second inductor L2 to appear at its anode.

The first output capacitor C1 reduces output voltage ripple at the first diode D1's cathode, thus smoothing out a positive output voltage Vo1. Likewise, the second capacitor C2 reduces output voltage ripple at the second diode D2's cathode, thus smoothing out a negative output voltage Vo2.

Referring next to a timing diagram of FIG. 13, the operation of the conventional voltage generator of FIG. 12 will be described. The first pulse generator PG1 produces a first pulse signal P1 that becomes high for a predetermined period T1 at predetermined intervals as shown in part (A) of FIG. 13. The second pulse generator PG2, on the other hand, produces a second pulse signal P2 that becomes low for another predetermined period T2 at predetermined intervals as shown in part (D) of FIG. 13.

The high level of P1 makes the n-channel switching transistor Q1 turn on, which connects one end of the first inductor L1 to the ground, enabling the source voltage Vin to be fully applied to the first inductor L1. The resulting current is shown in part (C) of FIG. 13, which produces magnetic fields within the first inductor L1, where electric energy is stored in magnetic form. At this moment, however, there is no current towards the output side because the diode D1 is grounded at its anode end and thus in a back-biased condition.

The pulse signal P1 returns to the low level when a predetermined period T1 has passed after its activation. The switching transistor Q1 then turns off, and the inductor current now has to decrease. The change in the current causes self-induction of the first inductor L1, producing an electromotive force (EMF) opposing that change. Since the produced counter-EMF appears as a forward bias voltage for the first diode D1, a current path is now created from the first inductor L1 to the positive voltage output Vo1. As a result, the voltage Vo1 rises according to the decrease of the inductor current, as shown in part (B) of FIG. 13. This means that the voltage induced in the first inductor L1 pumps up the positive output voltage Vo1 through the first diode D1.

Independently of the above process, the p-channel switching transistor Q2 turns on when the second pulse signal P2 becomes low. The activated switching transistor Q2 permits the source voltage Vin to be applied to the second inductor L2, thus causing a current flowing into it as shown in part (F) of FIG. 13. The resulting current creates magnetic fields within the second inductor L2, where electric energy is stored in magnetic form. There is no current towards the output side at the moment, because the second diode D2 is biased in the backward direction.

The second pulse signal P2 returns to high when a predetermined period T2 has passed after its activation. The second switching transistor Q2 then turns off, and the inductor current now has to decrease. The change in the current causes self-induction of the second inductor L2, producing an EMF opposing that change. The produced back-EMF, a negative voltage, appears as a forward bias to the second diode D2, and therefore, a current path is created from the negative voltage output Vo2 to the second inductor L2. As a result, the magnitude of the negative voltage output Vo2 increases according to the decrease of the inductor current, as shown in part (E) of FIG. 13. This means that the voltage induced in the second inductor L2 pumps up the negative output voltage Vo2 through the second diode D2.

In the way described above, the conventional supply voltage generator produces positive and negative output voltages of about fifteen volts, out of the source voltage Vin of about three volts.

While FIGS. 12 and 13 do not illustrate it specifically, the output voltages can be regulated by using pulse frequency modulation (PFM) techniques. PFM varies the interval (or frequency) of P1 and P2 according to the actual output voltages being observed, while keeping their constant pulse widths T1 and T2. More specifically, if the actual positive output voltage Vo1 becomes higher than its nominal level, the first pulse generator PG1 will activate the first pulse signal P1 less frequently to reduce the energy transferred to the output end. If the actual voltage Vo1 is lower than its nominal level, the first pulse generator PG1 will activate P1 more frequently to raise the output voltage Vo1. The negative output voltage Vo2 can be regulated in a similar way, where the second pulse generator PG2 varies the frequency of the second pulse signal P2, depending on the actual voltage level.

As explained in FIG. 12, conventional bipolar supply voltage generators need two inductors L1 and L2 to produce two voltages with opposite polarities. Those inductors are used to store a certain amount of energy in magnetic fields produced in their core. Inductor cores are made of magnetic material, and in order to store a sufficient amount of energy, inductors have to contain a reasonable amount of magnetic material. For this reason, it is hard to reduce the physical size of inductors, unlike capacitors. Conventional bipolar supply voltage generators use at least two such space-consuming components, which makes it difficult to reduce the size of portable electronic equipment mentioned in the first part of this description.

SUMMARY OF THE INVENTION

In view of the foregoing, it is an object of the present invention to provide a bipolar supply voltage generator, as well as a semiconductor device therefor, which is more suitable for small electronic equipment.

To accomplish the above object, the present invention provides a bipolar supply voltage generator which produces a positive and negative supply voltages from a unipolar power source. This bipolar supply voltage generator comprises the following components: an inductor; a first diode whose anode and cathode are connected to a first end of the inductor and a positive voltage output of the bipolar supply voltage generator, respectively; a second diode whose cathode and anode are connected to a second end of the inductor and a negative voltage output of the bipolar supply voltage generator, respectively; a first switch which connects the first end of the inductor to ground; a second switch which connects the second end of the inductor to the unipolar power source; and a controller which controls the first and second switches.

To accomplish the above object, the present invention also provides a semiconductor device, for use with an external inductor coupled thereto, which produces a positive and negative supply voltages from a unipolar power source. This semiconductor device comprises the following elements: a first diode whose anode and cathode are connected to a first end of the external inductor and a positive voltage output of the semiconductor device, respectively; a second diode whose cathode and anode are connected to a second end of the external inductor and a negative voltage output of the semiconductor device, respectively; a first switch which connects the first end of the external inductor to ground; a second switch which connects the second end of the external inductor to the unipolar power source; and a controller which controls the first and second switches.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
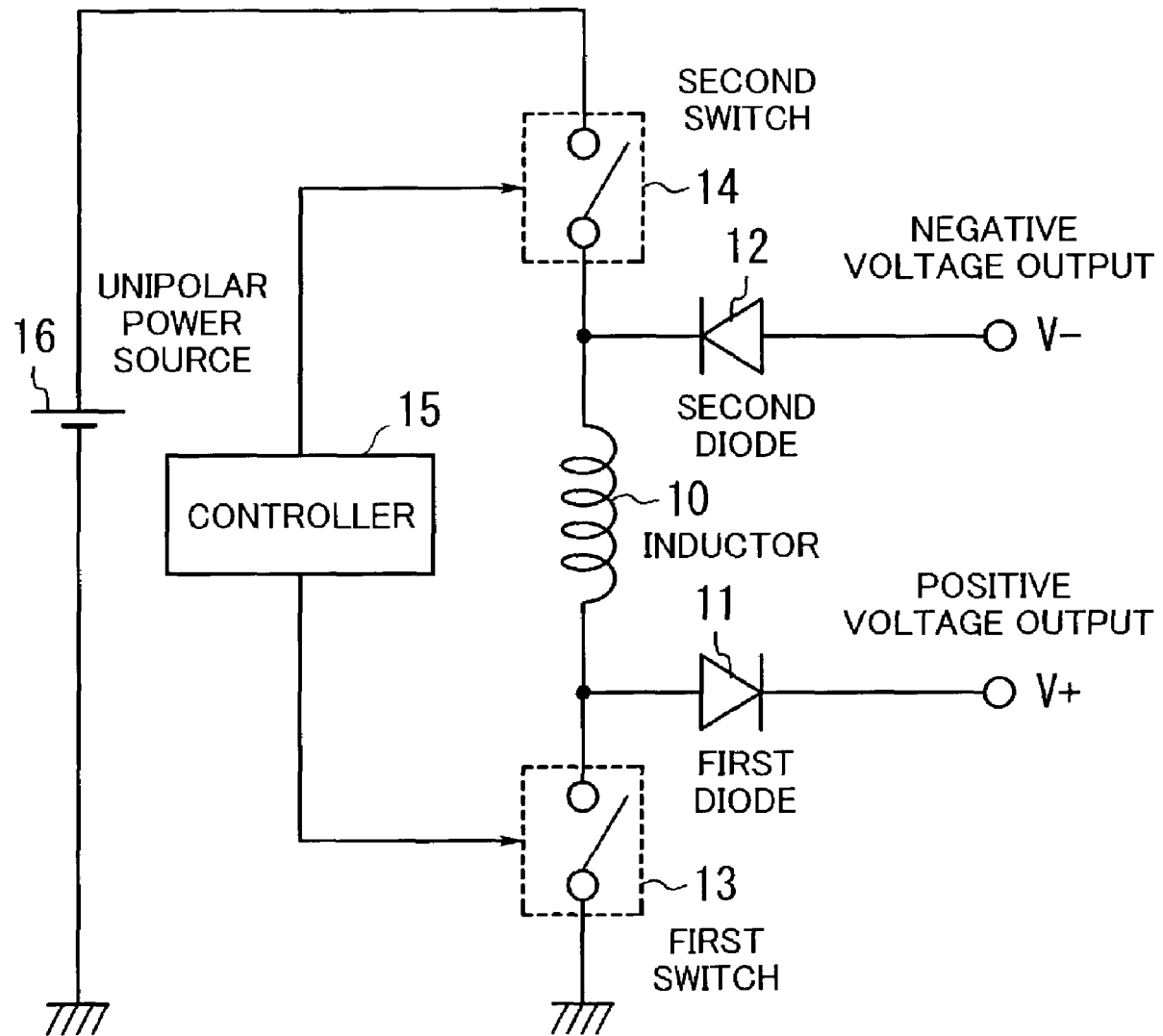
FIG. 1 is a conceptual view of the present invention.

Preferred embodiments of the present invention will be described below with reference to the accompanying drawings, wherein like reference numerals refer to like elements throughout.

FIG. 1 is a conceptual view of the present invention. The illustrated bipolar supply voltage generator comprises the following elements: an inductor 10, first and second diodes 11 and 12, first and second switches 13 and 14, a controller 15, and a unipolar power source 16.

The inductor 10 has an inductance of several tens to several hundreds of μH. This inductor 10 is supplied with electric energy from the unipolar power source 16 through the switches 13 and 14 and stores it in magnetic form. The magnetic energy in the inductor 10 can be released as electric energy again.

One end (first end) of the inductor 10 is connected to the anode of the first diode 11, while the other end (second end) is connected to the cathode of the second diode 12. The positive voltage output is taken from the cathode of the first diode 11, while the negative voltage output is drawn from the anode of the second diode 12. The diodes 11 and 12 are diodes suitable for switching purposes, including Schottky barrier diodes.

The first switch 13 grounds the first end of the inductor 10 according to the commands from the controller 15. The second switch 14 connects the second end of the inductor 10 to the unipolar power source 16 according to the commands from the controller 15. The controller 15 controls those first and second switches 13 and 14.

According to the first embodiment, the above-described bipolar supply voltage generator operates as follows. At first, the controller 15 turns on both switches 13 and 14, causing a current to flow from the unipolar power source 16 into the inductor 10. This is the beginning of what we refer to herein as the "first process." In the first process, the proposed circuit is supposed to produce a positive output voltage. (As will be described later, we also have a "second process" where a negative output voltage is produced.)

The inductor current, which is electric energy, creates magnetic fields within the inductor 10, and in this sense, the inductor 10 now stores a certain amount of energy in magnetic form. After the passage of a predetermined time (which must not be too long, lest the magnetic energy in the inductor 10 should reach the saturation level), the controller 15 turns off the first switch 13. The resulting disconnection of the inductor 10 from the ground forces the inductor 10 to reduce its current. As the inductor current decreases, a counter electromotive force (EMF) is developed across the inductor 10 because of its self-induction.

Since the voltage of the unipolar power source 16 is applied to its anode at this moment, the second diode 12 is back-biased and thus allows no current flow. The first diode 11, on the other hand, is now applied the sum of the voltage of the unipolar power source 16 and the counter EMF induced by the inductor 10. This produces a positive bias voltage for the first diode 11, making it turn on. As a result, that sum voltage appears at the cathode of the first diode 11, which is referred to as the positive output voltage V+. When the magnetic energy in the inductor 10 is exhausted, the controller 15 turns off the second switch 14, thus terminating the first process.

Subsequently, the controller 15 starts a "second process" by turning on both the two switches 13 and 14 again, which creates a current flowing from the unipolar power source 16 into the inductor 10 and thus stores the electric energy within the inductor 10 in the form of magnetic fields. At the expiration of a predetermined time, the controller 15 turns off the second switch 14 solely, the resulting disconnection of the unipolar power source 16 forcing the inductor 10 to reduce its current. As the inductor current decreases, a counter EMF is developed across the inductor 10 because of its self-induction.

With its anode grounded at this moment, the first diode 11 is biased in the backward direction and thus allows no current flow to the V+ output. The second diode 12, on the other hand, is applied the counter EMF of the inductor 10, which gives a positive bias voltage that makes it turn on. As a result, that counter EMF appears at the anode of the second diode 12, which is referred to as the negative supply voltage V−. When the magnetic energy stored in the inductor 10 is completely released, the controller 15 turns off the first switch 13, thus terminating the second process.

By repeating the above first and second processes, the circuit of FIG. 1 produces both positive and negative output voltages from the unipolar power source 16. Those output voltages can be controlled individually by varying the frequency of the first process or second process according to their current voltage levels. The proposed circuit structure permits a single inductor 10 to be used to produce both positive and negative voltages in this way. The present invention eliminates one inductor, thus contributing to the reduction of physical size of electronic equipment.

Figure 2:
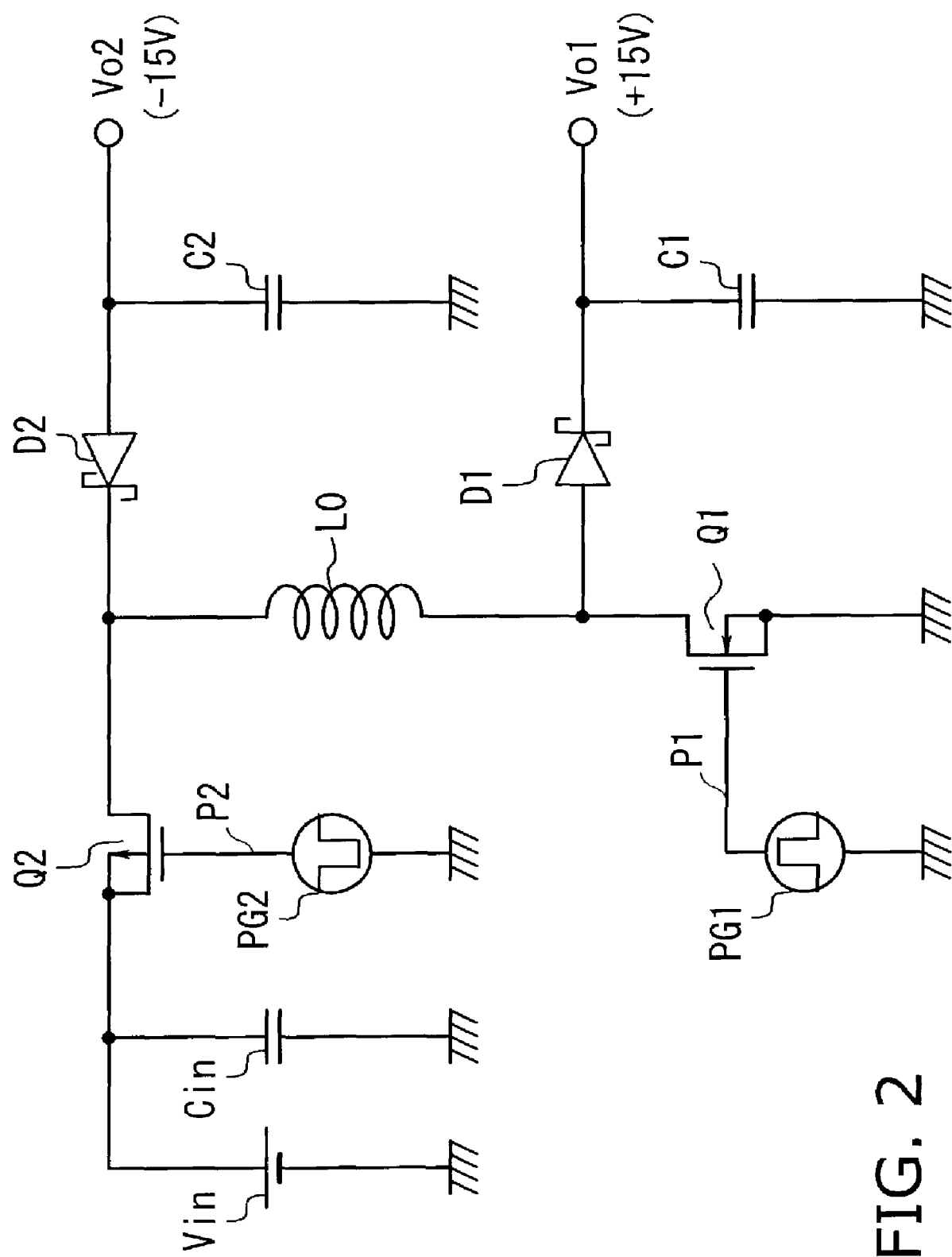
FIG. 2 shows a basic configuration of a first embodiment of the present invention.

Referring next to FIG. 2, we will describe the basic configuration of a first embodiment of the present invention. According to the first embodiment, the bipolar supply voltage generator comprises the following elements: an input power source with a voltage of Vin, an input capacitor Cin, two switching transistors Q1 and Q2, two pulse generators PG1 and PG2, an inductor L0, two diodes D1 and D2, and two output capacitors C1 and C2.

The input power source Vin is, for example, a lithium secondary battery with a voltage of three volts. The input capacitor Cin is connected between the source voltage Vin and ground to reduce its output impedance in high frequencies. The inductor L0 is a coil with an inductance of several tens to several hundreds of microhenries (μH). It stores incoming electrical energy in the form of magnetic fields, as well as releasing stored magnetic energy as electric energy.

The pulse generator PG1 produces a first pulse signal P1 to drive the first switching transistor Q1. Likewise, the second pulse generator PG2 produces a second pulse signal P2 to drive the second switching transistor Q2. The first switching transistor Q1, an n-channel MOSFET, turns on when the first pulse signal P1 becomes high, while it is otherwise in the OFF state. The second switching transistor Q2, a p-channel MOSFET, turns on when the second pulse signal P2 becomes low, while it is otherwise in the OFF state.

The diodes D1 and D2 act as switches that become active when their anode has a higher voltage than their cathode (i.e., forward biased), while otherwise shutting off the circuit. The first diode D1 with a forward bias allows a voltage developed across the inductor L0 to appear at its cathode. Likewise, the second diode D2 with a forward bias allows the voltage developed across the second inductor L0 to appear at its anode.

While the voltage appearing at the first diode D1's cathode contains some ripples, the first output capacitor C1 smoothes them out, thus producing a positive output voltage Vo1. Similarly, the second output capacitor C2 removes ripple components from the output voltage appearing at the second diode D2, thus producing a negative output voltage Vo2.

Figure 3:
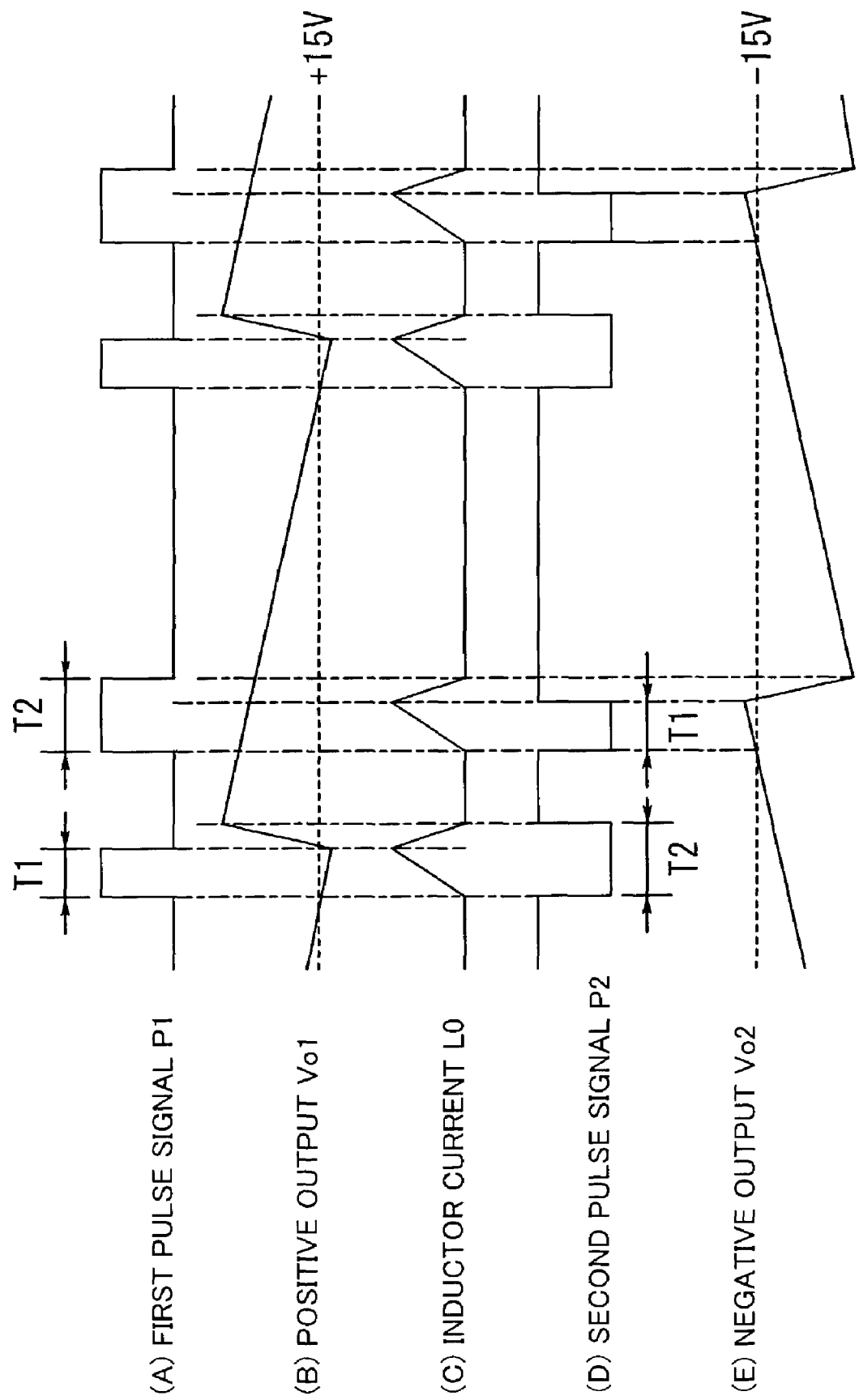
FIG. 3 is a timing diagram which explains the operation of the first embodiment shown in FIG. 2.

The above embodiment operates as follows. FIG. 3 is a timing diagram that explains how the first embodiment of FIG. 2 works. Part (A) of FIG. 3 shows the first pulse signal P1 (the active-high output of the first pulse generator PG1), which is repetitively asserted to a high level for a predetermined time T1 or T2. Part (B) of FIG. 3, on the other hand, shows the second pulse signal P2 (the active-low output of the second pulse generator PG2), which is repetitively asserted to a low level for a predetermined time T1 or T2. The phases of those pulse signals P1 and P2 are aligned at their leading edges, but not at their trailing edges. More specifically, P1 turns off after T1, while P2 turns off after T2. Or, P1 turns off after T2, while P2 turns off after T1.

The pulse signals P1 and P2 as such are supplied to the first and second switching transistors Q1 and Q2, respectively. When the first pulse signal P1 becomes high, the second pulse signal P2 becomes low at the same time. This activates both switching transistors Q1 and Q2, which sets up a connection path between the inductor L0 and the power source Vin, permitting a current to flow into the inductor L0 as shown in part (C) of FIG. 3. This current produces magnetic fields within the inductor L0, meaning that a certain amount of electric energy is stored in magnetic form. There is no output current to Vo1 since the first diode D1 is back-biased at the moment because its anode is grounded through Q1. The second diode D2 is also back-biased by the positive voltage Vin being applied at its cathode, allowing no output current to flow.

Upon expiration of time T1 after the two pulse signals P1 and P2 are asserted, the first pulse signal P1 is negated, thus turning off the first switching transistor Q1 alone. This reduces the current of the inductor L0, causing self-induction of an EMF voltage that opposes the reduction in current. Because the second switching transistor Q2 is still active, the voltage at the anode of the first diode D1 is the sum of the supply voltage Vin and the EMF induced by the inductor L0. The raised voltage gives a forward bias to the first diode D1, making it turn on. As a result, the sum voltage appears beyond the first diode D1 as the positive output voltage Vo1, as shown in part (B) of FIG. 3. When the second pulse signal P2 is negated upon expiration of time T2, the input power source Vin is disconnected from the circuit, which ends the release of stored energy from the inductor L0.

At the next stage, the two pulse signals P1 and P2 are both asserted once again, activating the two switching transistors Q1 and Q2. The inductor L0 is now connected to the power source Vin again, which permits a current to flow into the inductor L0 as shown in part (C) of FIG. 3. This current produces magnetic fields in the inductor L0, meaning that a certain amount of electric energy is converted and stored in the form of magnetic fields. There is no output current to Vo1 since the first diode D1 is back-biased at this moment because its anode is grounded via the first switching transistor Q1. The second diode D2 is also back-biased with a positive voltage applied at its cathode, thus allowing no output current to flow.

Upon expiration of time T1 after P1 and P2 are asserted, the second pulse signal P2 is negated alone, which turns off the second switching transistor Q2, but not the first switching transistor Q1. The inductor current now has to reduce, causing the inductor L0 to induce an EMF that opposes the reduction. Because the first switching transistor Q1 is still active, the cathode of the second diode D2 is driven by the induced EMF in the negative direction. This gives a forward bias to the second diode D2, making it turn on. As a result, the induced EMF voltage appears at the output terminal of Vo2 via the second diode D2 as shown in part (E) of FIG. 3. When the first pulse signal P1 is subsequently negated upon expiration of time T2, the inductor L0 is disconnected from the ground, which ends the release of energy therefrom.

Repeating the above switching operations, the proposed circuit of FIG. 2 produces both positive and negative voltages of about 15 volts from a single source voltage of about three volts.

Figure 4:
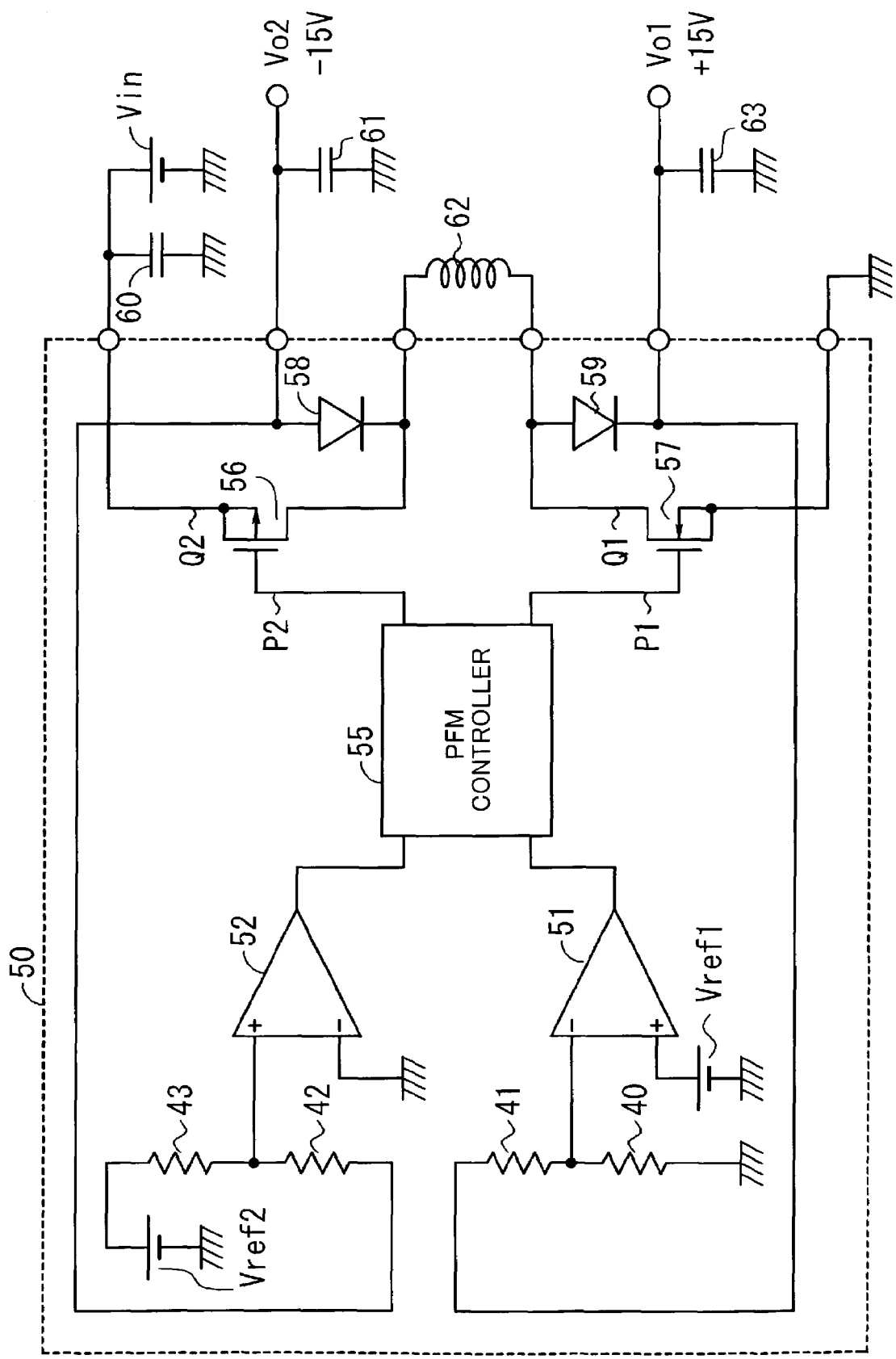
FIG. 4 shows a more specific circuit configuration of the first embodiment.
Figure 5:
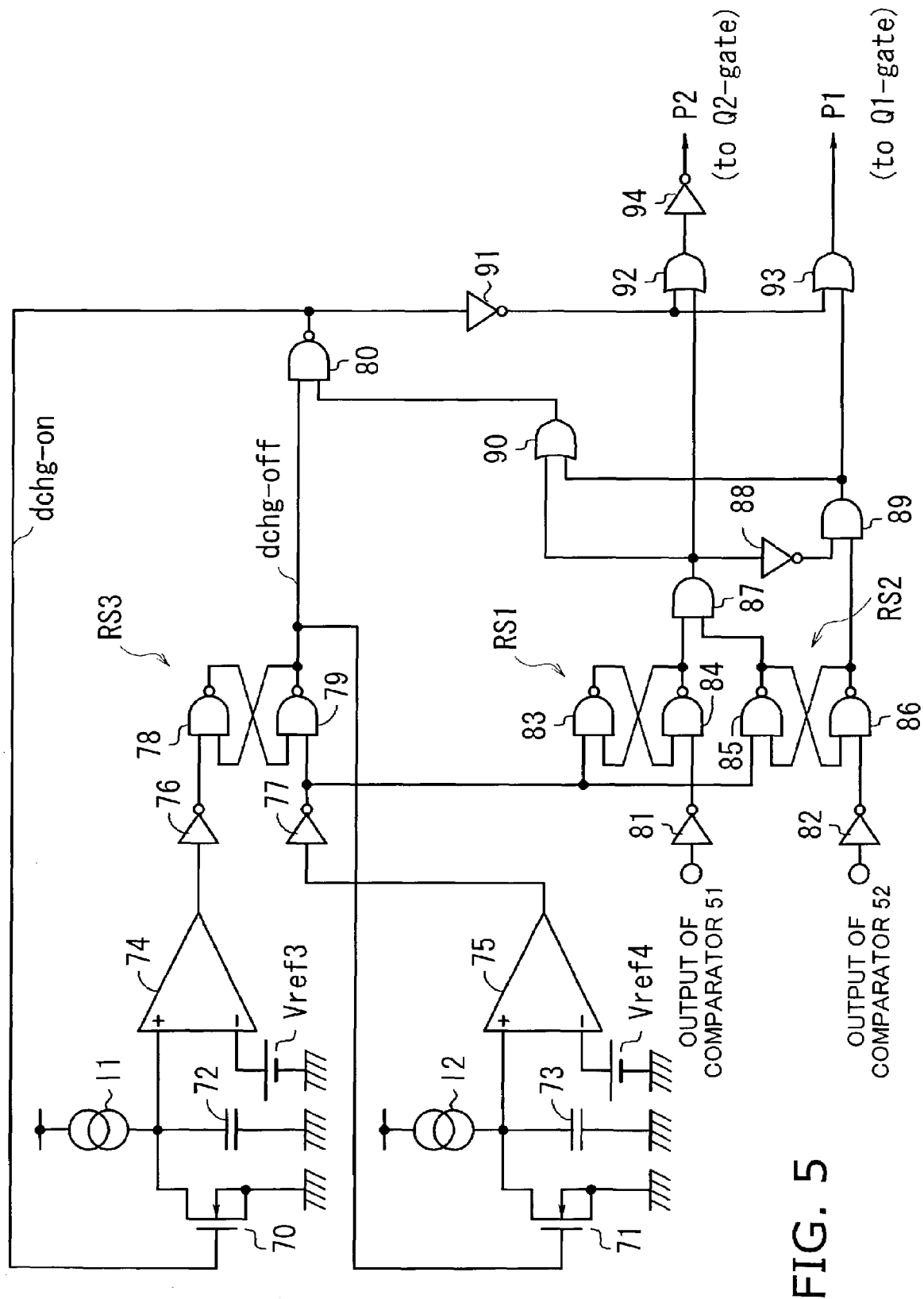
FIG. 5 shows the details of the PFM controller shown in FIG. 4.
Figure 6:
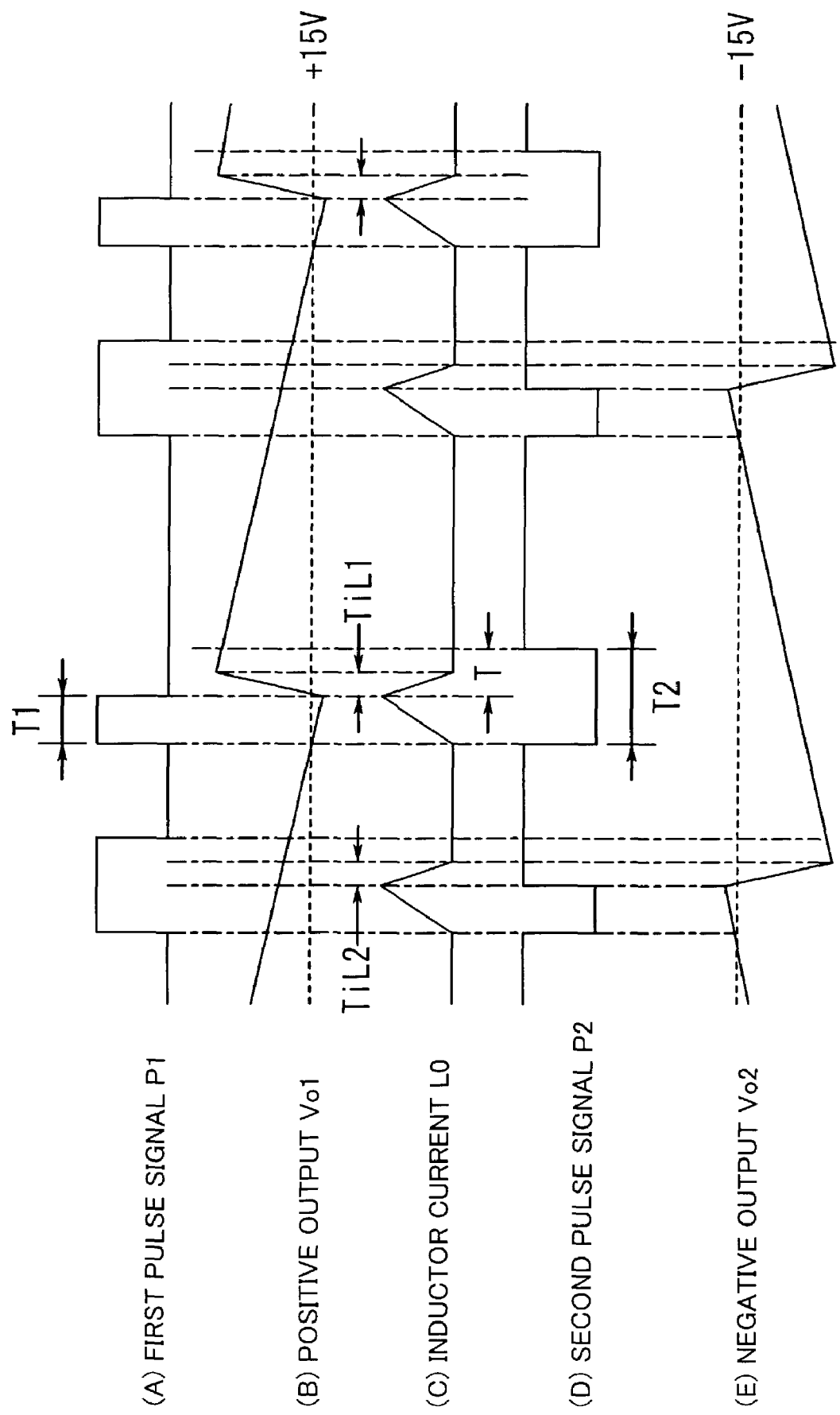
FIG. 6 is a timing diagram which explains the operation of the PFM controller shown in FIG. 5.

Referring now to FIGS. 4 to 6, a more specific circuit design will be presented. FIG. 4 is a bipolar supply voltage generator according to the first embodiment of the present invention. As seen, this circuit comprises an integrated semiconductor device 50 and some external components including: an input capacitor 60, a first output capacitor 61, an inductor 62, and a second output capacitor 63. This circuit is powered by a power source of a voltage Vin.

The integrated semiconductor device 50 contains the following elements: comparators 51 and 52, resistors 40 to 43, reference voltage sources Vref1 and Vref2, a pulse frequency modulation (PFM) controller 55, a p-channel switching transistor 56, an n-channel switching transistor 57, and diodes 58 and 59. The resistors 40 and 41 divide the positive output voltage Vo1. The first comparator 51 compares this divided voltage effectively with a given first reference voltage Vref1 and sends the result to the PFM controller 55. Similarly, another pair of resistors 42 and 43 divide the negative output voltage Vo2, and the second comparator 52 compares this divided voltage with a given second reference voltage Vref2 and sends the result to the PFM controller 55. The PFM controller 55 controls switching transistors 56 and 57 according to the outputs of the comparators 51 and 52.

FIG. 5 shows the PFM controller 55 in greater detail. As seen, the PFM controller 55 comprises the following elements: switching transistors 70 and 71, capacitors 72 and 73, constant current sources I1 and I2, comparators 74 and 75, reference voltage sources Vref3 and Vref4, inverters 76, 77, 81, 82, 88, 91, and 94, NAND gates 78 to 80 and 83 to 86, AND gates 87 and 89, and OR gates 90, 92, and 93.

The upper-left block of FIG. 5 (i.e., switching transistor 70, constant current source I1, capacitor 72, reference voltage source Vref3, and comparator 74) is a circuit that determines how long the switching transistors 56 and 57 should both be turned on (referred to as "turn-on time"). This circuit is triggered by a high-to-low transition of the NAND gate 80's output (labeled "dchg-on" in FIG. 5), which turns off the switching transistor 70 and allows the constant current source I1 to charge the capacitor 72. When the resulting voltage increase at the capacitor 72 has reached the reference voltage Vref3, the comparator 74 changes its output from low to high.

On the other hand, the lower-left block of FIG. 5 (i.e., switching transistor 71, constant current source I2, capacitor 73, reference voltage source Vref4, and comparator 75) is a circuit that determines when to turn off the switching transistors 56 and 57 (referred to as "turn-off time"). This circuit is triggered by a high-to-low transition of the NAND gate 79's output (labeled "dchg-off" in FIG. 5), which turns off the switching transistor 71 and allows the constant current source I2 to charge the capacitor 73. When the resulting voltage increase at the capacitor 73 has reached the reference voltage Vref4, the comparator 75 changes its output from low to high.

The inverters 76 and 77 and NAND gates 78 and 79 form a reset-set (RS) flip-flop which is set by the comparator 75's output and reset by the comparator 74's output. This RS flip-flop is labeled "RS3" in FIG. 5. Similar to RS3, the inverters 77 and 81 and NAND gates 83 and 84 form another RS flip-flop which is set by the comparator 51's output and reset by the comparator 75's output. This RS flip-flop is labeled "RS1" in FIG. 5. Further, the inverters 77 and 82 and NAND gates 85 and 86 form yet another RS flip-flop which is set by the comparator 52's output and reset by the comparator 75's output. This RS flip-flop is labeled "RS2" in FIG. 5. Note that in FIG. 5 the lower gate output of each RS flip-flop is referred to as the "non-inverted output."

The AND gate 87 calculates the logical AND between the outcomes of the NAND gates 84 and 85, which are the non-inverted output of RS1 and the inverted output of RS2, respectively. That is, the AND gate 87 goes high when RS1 is set and RS2 is reset. The inverter 88 inverts the output of this AND gate 87, and it is then ANDed by the AND gate 89 with the NAND gate 86's output (i.e., the non-inverted output of RS2). This means that the AND gate 89 goes high when the flip-flop RS2 is set, and the output of the AND gate 87 is low.

The OR gate 90 produces the logical sum of the outputs of the above two AND gates 87 and 89. The NAND gate 80 then calculates the logical product of this sum and the NAND gate 79's output (i.e., non-inverted output of RS3) and outputs the result in negative logic. The inverter 91 reconverts the output of this NAND gate 80 into positive logic. The OR gate 93 calculates the logical sum of the outputs of the AND gate 89 and inverter 91 for use in controlling the n-channel switching transistor 57. Likewise, the OR gate 92 calculates the logical sum of the outputs of the AND gate 87 and inverter 91. The inverter 94 inverts this result for use in controlling the p-channel switching transistor 56.

The above PFM controller 55 operates as follows. When the circuit shown in FIG. 4 starts up, the outputs of the comparators 51 and 52 are both in the high state since neither the positive output voltage Vo1 nor the negative output voltage Vo2 has reached their nominal levels (i.e., +15 V and −15 V). Thus the flip-flops RS1 and RS2 are both set, meaning that the outputs of the NAND gates 84 and 86 are high. This makes the AND gate 87's output low and the AND gate 89's output high, which causes the OR gate 90 to output a high level.

The flip-flop RS3 can be assumed to be set initially. The outputs of the comparator 74 and 75 are both low since the capacitors 72 and 73 are not charged at all at the moment, allowing the flip-flop RS3 to maintain its initial state. That is, since the dchg-off signal is high, the high output of the OR gate 90 causes the NAND gate 80 to activate its output (dchg-on signal) to a low level. Accordingly, the inverter 91 supplies a high level signal to the OR gates 92 and 93, thus turning on the two switching transistors 56 and 57 simultaneously. The activated switching transistors 56 and 57 produce a connection between the power source Vin and inductor 62, permitting a current to flow into the latter. The inductor 62 now stores a certain amount of magnetic energy as a result of that current.

The dchg-off signal is still in the high state because the flip-flop RS3 is set, keeping the capacitor 73 short-circuited by the switching transistor 71. The comparator 75 thus maintains its low level output. The dchg-on signal, on the other hand, is in the low state since the NAND gate 80 has become active, and this turns off the switching transistor 70. The capacitor 72 is thus charged up with a current from the constant current source I1. When this capacitor voltage exceeds the reference voltage Vref3, the comparator 74 changes its output state from low to high, and it resets the flip-flop RS3. The output of the NAND gate 79 becomes low, and this makes the inverter 91 output a low level. Accordingly, the output of the OR gate 92 changes to low, thus turning off one switching transistor 56, while allowing the other switching transistor 57 to maintain its ON state. This results in a forward bias voltage that is large enough for the diode 58 to become conductive, so that the inductor 62 will release its stored energy to boost the negative output voltage Vo2. The output capacitor 61 is charged with the released energy, and the increase in voltage Vo2 makes the comparator 52 reverse its output from high to low.

Since the flip-flop RS3 has been reset and the dchg-off signal is low, the switching transistor 71 is in the OFF state, allowing the capacitor 73 to be charged with a current from the constant current source I2. When the capacitor voltage reaches the reference voltage Vref4, the comparator 75 changes its output from low to high, which resets the flip-flops RS1 and RS2, besides setting RS3 again. The output of the OR gate 93 then becomes low, thus turning off the switching transistor 57.

While the output of the comparator 52 has become low because of the development of the negative output voltage Vo2, the comparator 51 still remains in the high state, and accordingly, the flip-flop RS1 is set again. Since the flip-flop RS2 is reset at the moment, the AND gate 87 asserts its output to a high level, permitting the NAND gate 80 to change its output to low. This change causes the inverter 91 to output a high level signal, which passes through the OR gates 92 and 93 to activate both the two switching transistors 56 and 57. With the dchg-on signal driven low, the capacitor 72 starts to be charged with a current from the constant current source I1. When this capacitor voltage reaches the reference voltage Vref3, the comparator 74 outputs a high level signal, which resets the flip-flop RS3. The output of the NAND gate 79 now becomes low, making dchg-off low and dchg-on high. This discharges the capacitor 72, as well as allowing the capacitor 73 to start charging.

The output of the inverter 91 has become low. While this change does not affect the state of the OR gate 92 because the output of the AND gate 87 is high, the OR gate 93 alters its output from high to low. Then the switching transistor 57 turns off, which causes the inductor 62 to transfer its stored energy to the positive output voltage Vo1 via the diode 59. When the capacitor 73 is charged up to the reference voltage Vref4, the comparator 75 changes its output from low to high, thus setting the flip-flop RS3. This means that the dchg-off signal becomes high, and the capacitor 73 is discharged. Since the high level output of the comparator 75 also resets the flip-flops RS1 and RS2, the output of the OR gate 90 becomes low, which then makes the dchg-on signal high. The capacitor 72 is thus discharged by the activated switching transistor 70.

The proposed bipolar supply voltage generator begins supplying both positive and negative voltages Vo1 and Vo2 in the way described above. The load current of each output then causes a voltage drop. Consider, for example, that the negative output voltage Vo2 shows such a drop. If the actual voltage Vo2 falls below the nominal voltage, the comparator 52 detects it and outputs a high level signal. This signal sets the flip-flop RS2, making the OR gate 90 go high and the NAND gate 80 go low. Both switching transistors 56 and 57 turn on, and a current begins to flow into the inductor 62. At the same time, the voltage of the capacitor 72 starts to rise since the dchg-on signal is low.

When the capacitor voltage reaches the reference voltage Vref3, the comparator 74 changes its output from low to high, which resets the flip-flop RS3. This causes the NAND gate 80 to negate its output to a high level. The output of the OR gate 92 then returns to low, while the other OR gate 93 maintains its high-level output. The switching transistor 56 now turns off, while the other switching transistor 57 remains in the active state. With the additional power supplied from the inductor 62, the negative output voltage Vo2 recovers its voltage level.

At the moment, the dchg-off signal is low and the dchg-on signal is high. The former causes the capacitor 73 to be charged up, while the latter makes the capacitor 72 discharged. When the voltage of the capacitor 73 reaches the reference voltage Vref4, the comparator 75 changes its output from low to high, which sets the flip-flop RS3 and resets the other two flip-flops RS1 and RS2. Now the dchg-off and dchg-on signals are both high, meaning that the two capacitors 72 and 73 are both discharged.

The outputs Vo1 and Vo2 will be recovered from any subsequent voltage drop, since additional power is supplied in the way described above, every time it is needed. That is, the positive output voltage Vo1 and negative output voltage Vo2 are both controlled to maintain their respective nominal voltage levels.

FIG. 6 is a timing diagram which depicts the operation of the first embodiment explained above. As shown in part (A) and part (D) of FIG. 6, T1 is the time constant of the capacitor 72 and constant current source I1, and T is the time constant of the capacitor 73 and constant current source I2. FIG. 6 indicates another time constant T2, which is actually the sum of T1 and T. Here, it is assumed that a time TiL1 is required to charge the positive output voltage Vo1, while a time TiL2 is required to charge the negative output voltage Vo2. According to the present embodiment, the time constant T should be greater than both TiL1 and TiL2. That is, each switching transistor 56 or 57 retains its ON state for the fixed duration T, within which the inductor current L0 shown in part (C) is supposed to be settled. By choosing the value of T in this way, the present invention eliminates the need for detecting the expiration of TiL1 and TiL2 individually, which is advantageous in terms of the simplicity of circuit design.

As seen from the above explanation, the first embodiment of the present invention produces both positive and negative voltages with a single inductor 62, as opposed to two inductors used in conventional circuits. Since it is hard to reduce the size of inductors, the elimination of one inductor is advantageous in developing small-sized equipment. Also, the proposed structure has a single consolidated voltage controller to regulate both positive and negative voltages, unlike conventional circuits which employ two independent controllers for the same purpose. This simplicity as well will contribute to size reduction of equipment.

It should also be noted that the AND gates 87 and 89 and inverter 88 are employed to ensure that the negative voltage be available earlier than the positive voltage when the equipment is powered up. That is, the very first cycle of switching operation is designed to turn off the switching transistor 56 earlier than the other one, meaning that a negative voltage is produced first. This feature is particularly suitable for such equipment as liquid crystal displays, which needs a negative supply voltage prior to a positive voltage.

Figure 7:
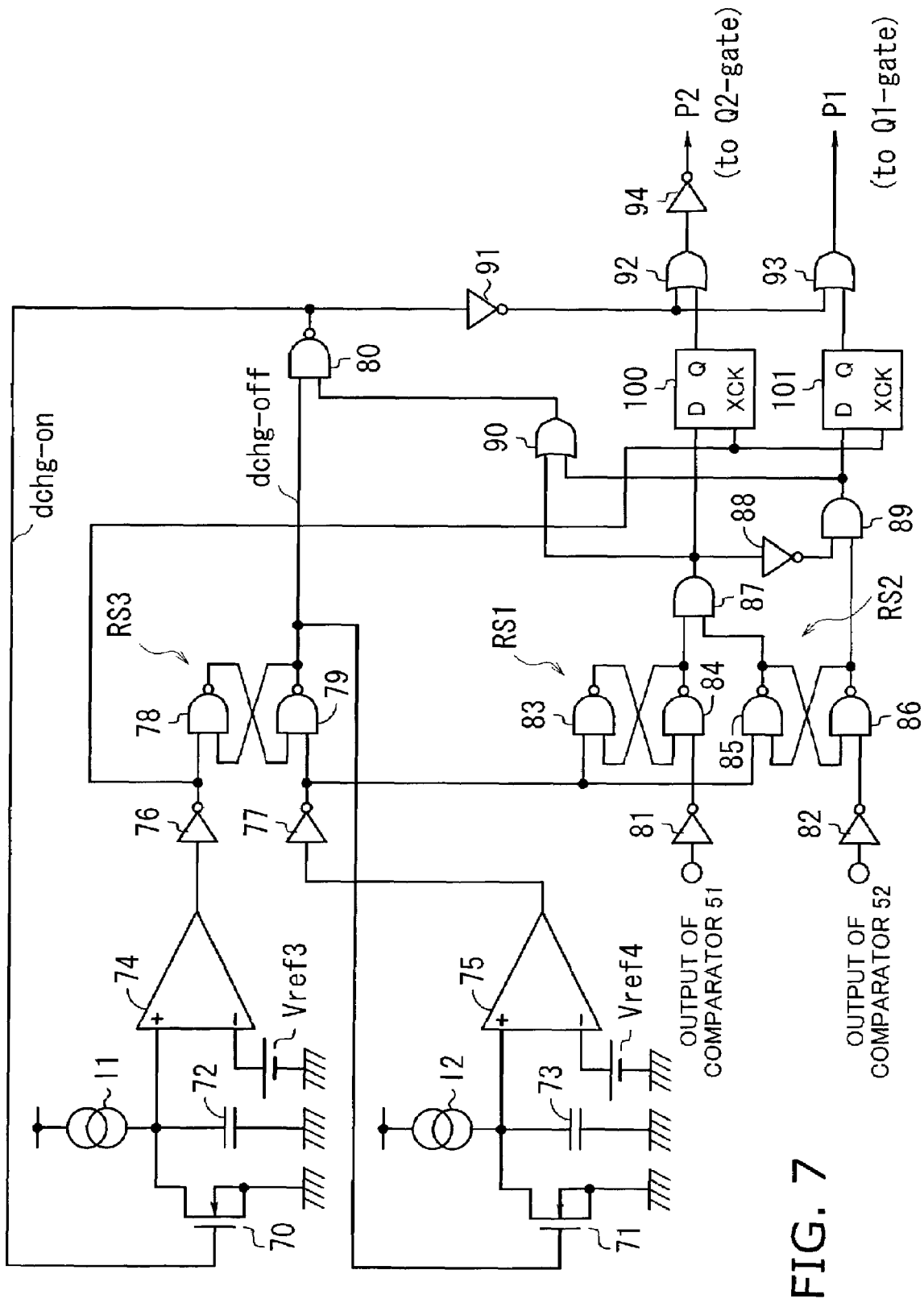
FIG. 7 is another detailed configuration of the PFM controller shown in FIG. 4.

Referring next to FIG. 7, we will describe another configuration of the PFM controller 55 that can be used in the circuit of FIG. 4. While most part is similar to the circuit explained in FIG. 5, the PFM controller 55 of FIG. 7 includes two D-type flip-flops 100 and 101 as additional elements. The former D-type flip-flop 100 captures the output of the AND gate 87 each time the inverter 76 goes low (i.e., at the expiration of turn-on time T1) and holds it until the next capture. Similarly, the other D-type flip-flop 101 captures the output of the AND gate 89 each time the inverter 76 goes low and holds it until the next capture.

Figure 8:
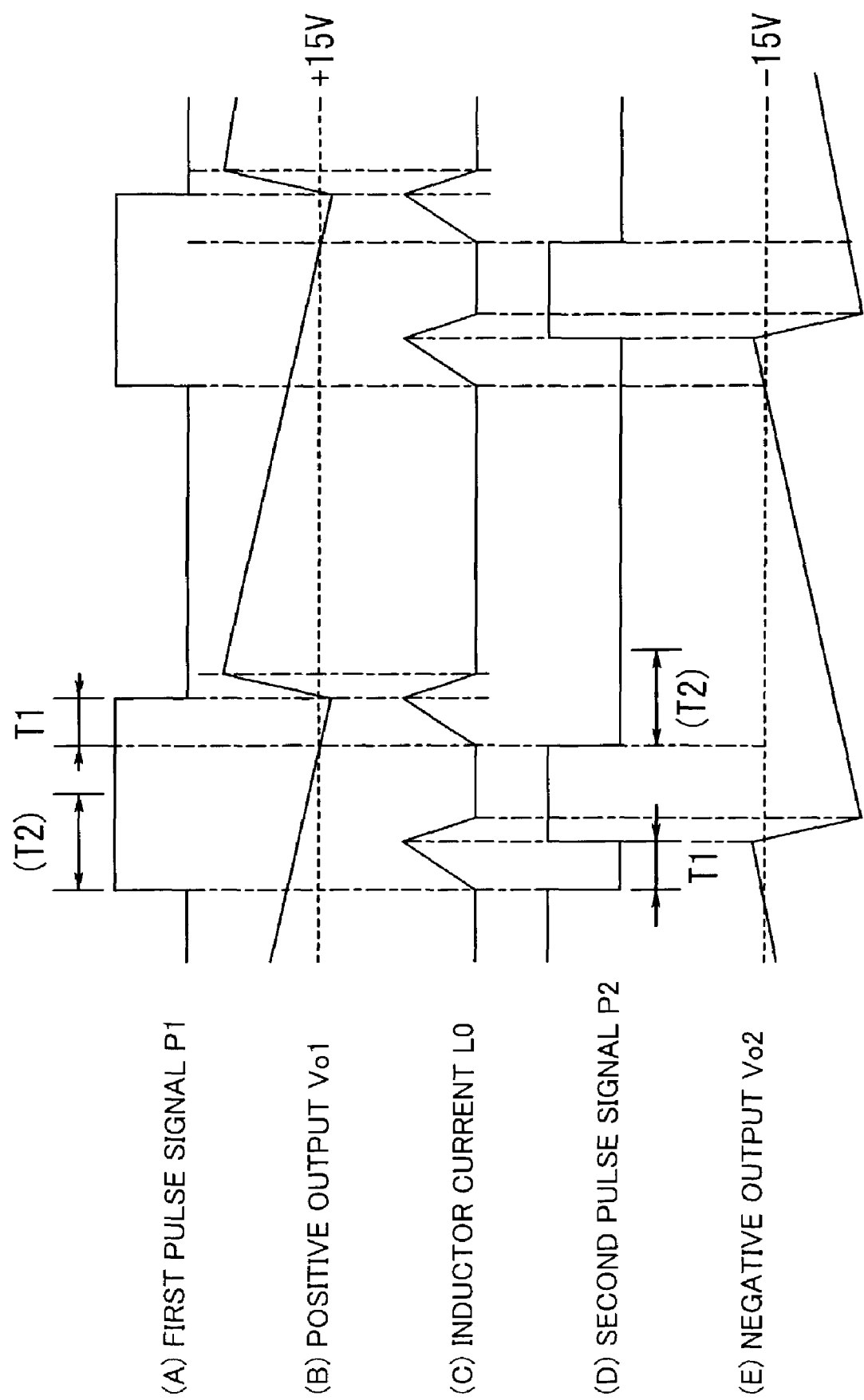
FIG. 8 is a timing diagram which explains the operation of the alternative PFM controller shown in FIG. 7.

FIG. 8 depicts how the modified PFM controller 55 operates. As seen from part (A) of this timing diagram, the high state of the first pulse signal P1 is partly sustained as a result of hold operation of the D-type flip-flop 101. More specifically, P1 does not returns to low at the expiration of time T2, but retains its high state until the next switching process begins. Likewise, as seen from part (D) of FIG. 8, the low state of the second pulse signal P2 is partly sustained as a result of hold operation of the D-type flip-flop 100. That is, P2 does not returns to high at the expiration of time T2, but retains its low state until the next switching process starts.

With the above configuration, the modified PFM controller 55 changes the state of the switching transistors 56 and 57 less frequently than the original circuit explained in FIG. 5. Reduced switching frequency results in smaller switching noises, besides saving power.

Figure 9:
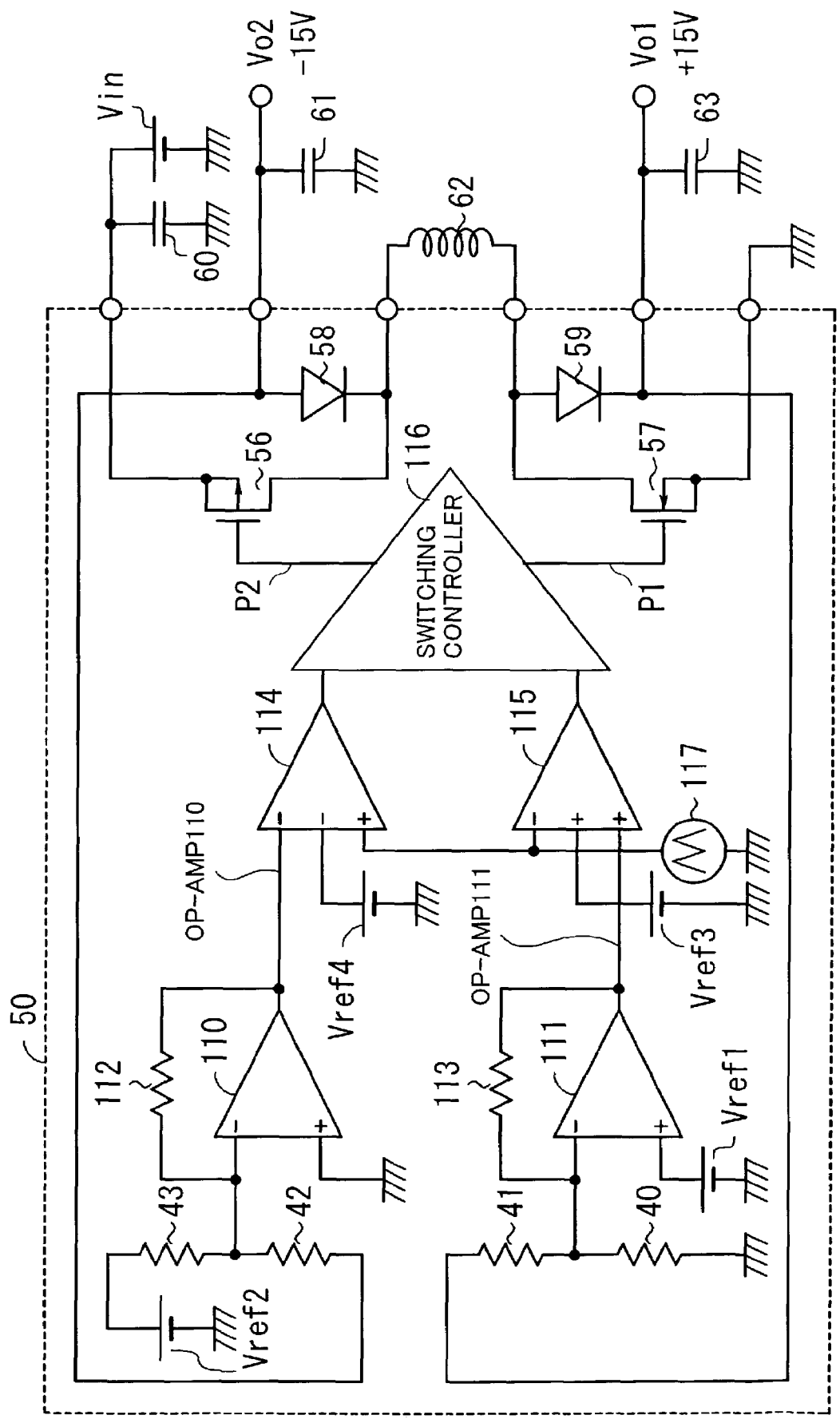
FIG. 9 shows a circuit according to a second embodiment of the present invention.

Referring now to FIG. 9, a second embodiment of the present invention will be described below. This second embodiment differs from the first embodiment (FIG. 4) in its use of pulse width modulation (PWM) techniques to regulate the output voltages. Other like components are referred to by like reference numerals and will not be further explained here.

Specifically, the second embodiment employs two operational amplifiers (OP amplifiers) 110 and 111 with feedback resistors 112 and 113, instead of the comparators 51 and 52 in the first embodiment (see FIG. 4). Other new elements are: PWM comparators 114 and 115, reference voltage sources Vref3 and Vref4, a switching controller 116, and a triangle wave generator 117.

The OP amplifier 110 is combined with resistors 42, 43, and 112, to form an inverting amplifier that adds the reference voltage Vref2 and negative output voltage Vo2, multiplying each by a specific gain. The output signal is referred to by the symbol "OP-AMP110." Likewise, the other OP amplifier 111 and resistors 40, 41, and 113 form an inverting amplifier that amplifies the difference between a fraction of the positive output voltage Vo1 and the reference voltage Vref1 with a specific gain. The output signal is referred to by the symbol "OP-AMP111." The above two OP amplifiers 110 and 111 thus function as error amplifiers that amplify the error of each actual output voltage with respect to its desired voltage.

The PWM comparator 114 compares both the OP amplifier 110's output and reference voltage Vref4 with a triangle wave that is provided from the triangle wave generator 117. It outputs a low level signal when the triangle wave voltage falls below the former two voltages, or otherwise a high level signal. Similar to this, the other PWM comparator 115 compares both the OP amplifier 111's output and reference voltage Vref3 with the triangle wave, producing a low level signal when the triangle wave voltage falls below the former two voltages, or otherwise a high level signal.

The two reference voltages Vref3 and Vref4 are selected to set an appropriate upper limit to how long each switching transistor 56 and 57 can be turned on. The switching controller 116 controls the switching transistors 56 and 57 according to the output signals of the PWM comparators 114 and 115.

Referring now to the timing diagram of FIG. 10, the operation of the second embodiment will be described below. When the equipment starts up, the triangle wave generator 117 begins supplying the PWM comparators 114 and 115 with a triangle wave shown in part (A) of FIG. 10. Since the positive and negative output voltages are both zero at this early stage after start-up, the OP amplifiers 110 and 111 output a negative and positive voltages to the PWM comparators 114 and 115, respectively.

The PWM comparator 114 compares both the OP-AMP110 signal and reference voltage Vref4 with the given triangle wave. It produces a low level signal when the triangle wave voltage falls below the former two voltages, or otherwise a high level signal. The reference voltage Vref4 gives an upper limit to the turn-on time of the switching transistors 56 and 57 as mentioned above, preventing the magnetic energy in the inductor 62 from being saturated. This turn-on time limiting function avoids unnecessary power consumption.

The PWM comparator 115, on the other hand, compares both the OP-AMP111 signal and reference voltage Vref3 with the given triangle wave. It produces a low level signal when the triangle wave voltage falls below the former two voltages, or otherwise a high level signal. Like Vref4, the reference voltage Vref3 limits the turn-on time of the switching transistors 56 and 57 as mentioned above, which prevents the magnetic energy in the inductor 62 from being saturated and thus avoids unnecessary power consumption.

The output signals of those PWM comparators 114 and 115 are supplied to the switching controller 116 for use in controlling the switching transistors 56 and 57. FIG. 10 shows an example of the above PWM operation, where the triangle wave shown in part (A) is sliced at the OP-AMP111 signal level (indicated by the upper broken line). When the triangle wave exceeds that level, the switching controller 116 produces a first and second pulse signals P1 and P2 to turn on both switching transistors 56 and 57. This results in a current flowing in the inductor 62 as shown in part (D) of FIG. 10, the electric energy of which is stored as magnetic fields within the inductor 62.

The first pulse signal P1 is negated as shown in part (B) of FIG. 10, when the triangle wave returns to a level below OP-AMP111. The switching transistor 57 thus turns off, permitting the magnetic energy in the inductor 62 to be released as electric energy to the positive voltage output as shown in part (C). Here, the energy stored in the inductor 62 is proportional to the length of the period T1 when the switching transistors 56 and 57 are both active. This period becomes longer as the OP-AMP111 signal decreases in voltage levels, meaning that a greater energy will be stored in the inductor 62 when a larger voltage drop is observed at the positive output voltage Vo1.

The switching controller 116 then turns off the switching transistor 56 after a predetermined time subsequent to the negation of the first pulse signal P1. This is illustrated in part (E) of FIG. 10, where the second pulse signal P2 changes from low to high with a delay time of T.

Figure 10:
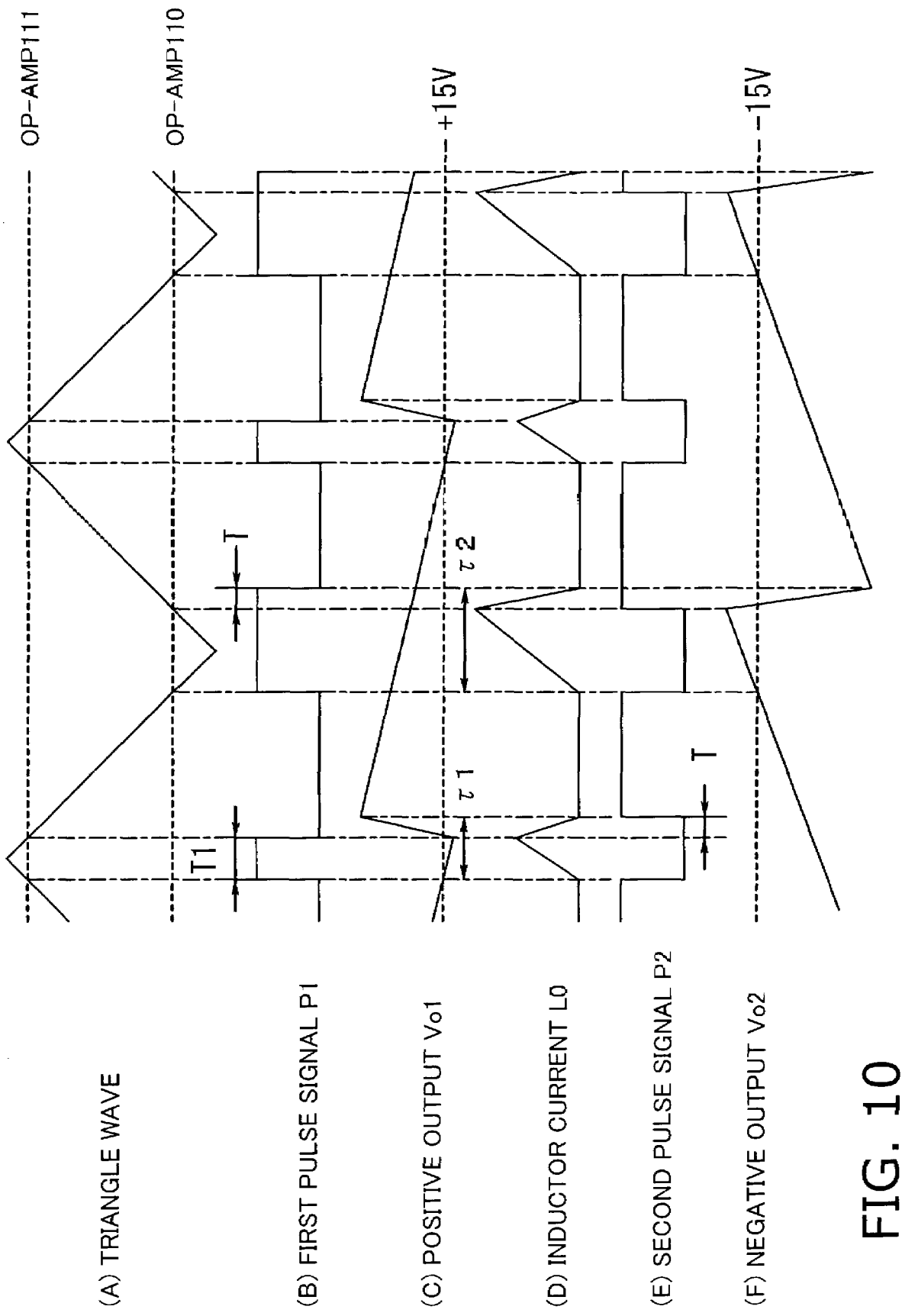
FIG. 10 is a timing diagram which explains the operation of the second embodiment shown in FIG. 9.

The triangle wave is also sliced at the OP-AMP110 signal level as indicated by the lower broken line in part (A) of FIG. 10. When the triangle wave falls below this level, the switching controller 116 asserts both first and second pulse signals P1 and P2 to turn on the switching transistors 56 and 57. This causes a current to flow into the inductor 62, the electric energy of which is stored in the form of magnetic fields. The switching controller 116 keeps the second pulse signal P2 active until the triangle wave crosses the OP-AMP110 level again. The switching transistor 56 turns off alone, permitting the magnetic energy stored in the inductor 62 to be released as electric energy to the negative voltage output as shown in part (F). Note that the inductor 62 stores more magnetic energy as the OP-AMP110 signal rises. This means that a greater power will be transferred to the negative voltage output Vo2, when a larger voltage drop is observed at the negative output voltage Vo2.

The switching controller 116 then turns off the other switching transistor 57 after a predetermined time subsequent to the negation of the second pulse signal P2. This is illustrated in part (B) of FIG. 10, where the first pulse signal P1 changes from high to low with a delay time of T.

The above process is repeated according to the interval of the triangle wave. The active period of each switching transistor 56 and 57 is dynamically varied (hence the pulse width modulation), depending on the actual levels of the positive and negative voltage outputs Vo1 and Vo2. The output voltages are regulated in this way.

The above explanation of the second embodiment has assumed that the switching controller 116 is designed to turn off both switching transistors 56 and 57 each time the current switching operation is finished. We do not intend, however, to limit the present embodiment to that specific design. It would be possible to configure the switching controller 116 to sustain the ON state of either switching transistor in the same way as explained earlier in FIGS. 7 and 8.

Figure 11:
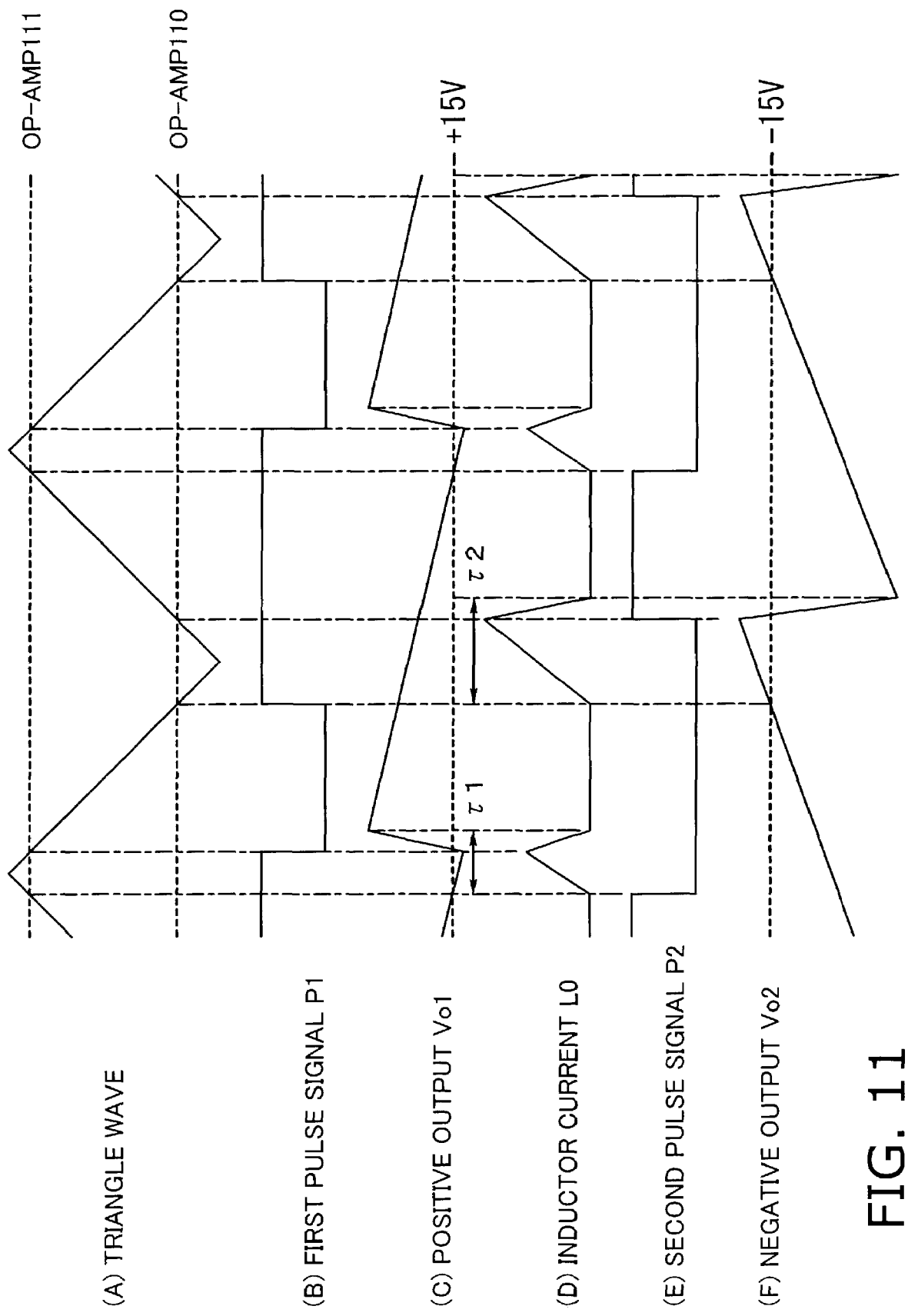
FIG. 11 is another timing diagram which explains the operation of the second embodiment shown in FIG. 9.
Figure 12:
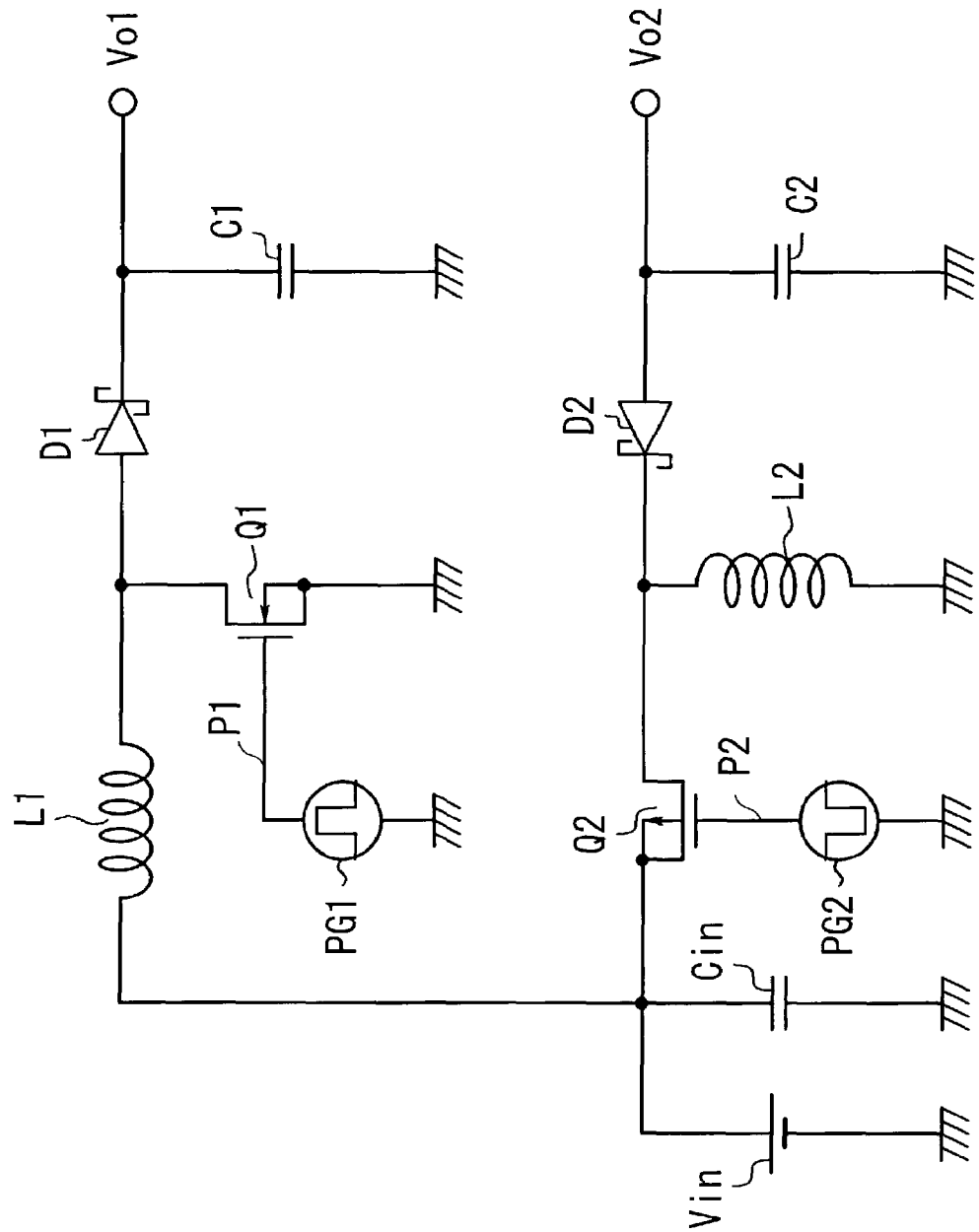
FIG. 12 shows a typical configuration of a conventional bipolar supply voltage generator.
Figure 13:
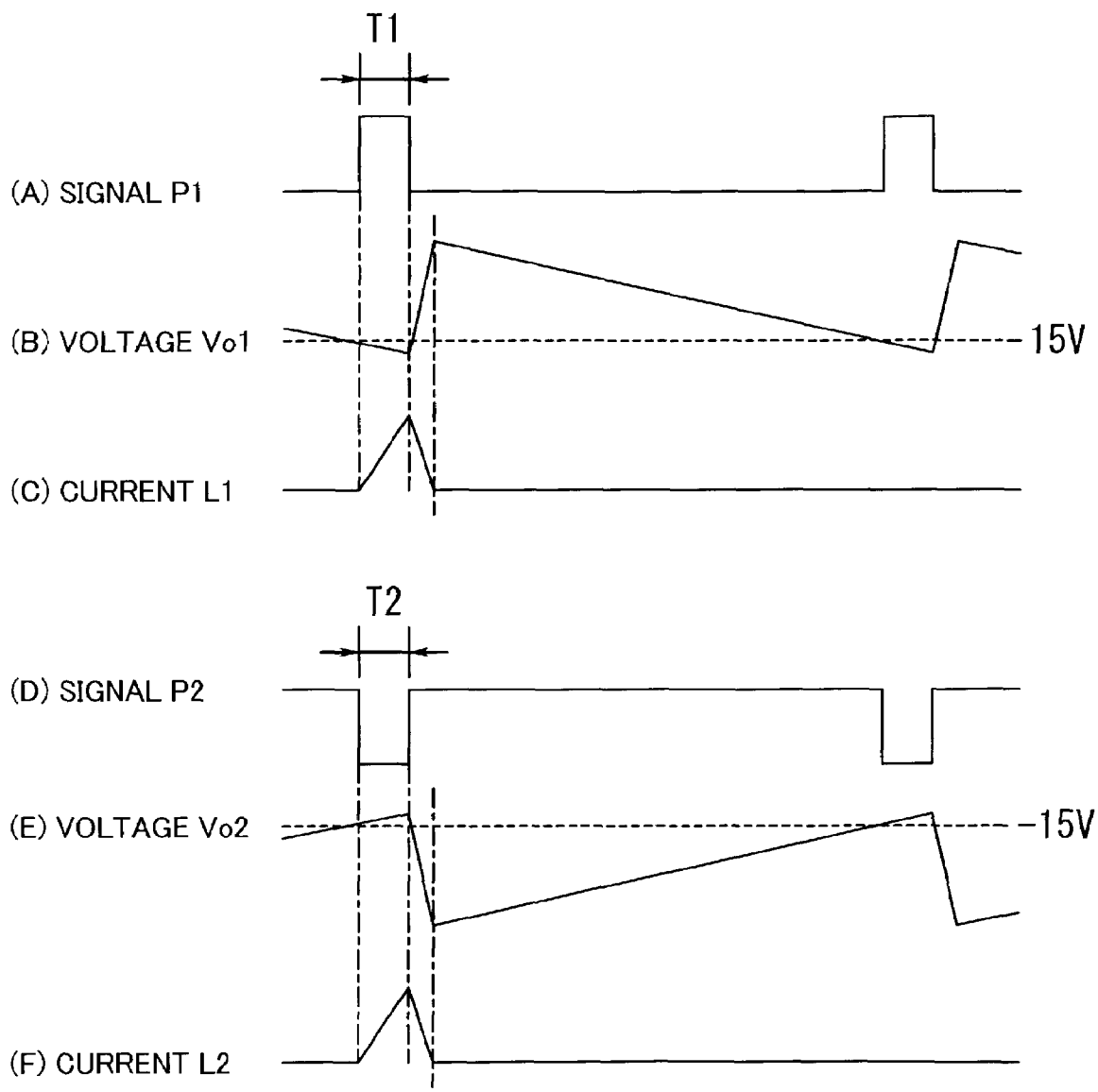
FIG. 13 is a timing diagram which shows the operation of the conventional circuit of FIG. 12.

FIG. 11 is a timing diagram showing how the switching controller 116 operates with the alternative configuration introduced above. The first pulse signal P1 shown in part (B) of FIG. 11 is different from that in FIG. 10 in that its high state is partly retained until the next switching cycle. Referring back to FIG. 10, see, for example, the first bottom of the triangle wave shown in part (A). Here, the waveform of P1 in part (A) of FIG. 10 becomes low, when the time τ2 has passed after its activation. In FIG. 11, however, the first pulse signal P1 does not become low at that time, but keeps its ON state until the next peak of the triangle wave is encountered.

Then take the first peak of the triangle wave, for another example. The waveform of the second pulse signal P2 in part (E) of FIG. 10 shows that P2 goes low when the time τ1 has passed after its activation. In contrast to this, the waveform of P2 shown in part (E) of FIG. 11 holds its low state until the next bottom of the triangle wave is encountered.

As seen from the above discussion, the alternative switching control method permits the switching transistors 56 and 57 to keep their ON state under certain conditions. In other words, the switching transistors 56 and 57 change their state less frequently, compared to the original version of the second embodiment. Besides reducing switching noises, this configuration avoids wasting energy in unnecessary switching operation.

As in the first embodiment, the second embodiment produces both positive and negative voltages with a single inductor, as opposed to two inductors used in conventional circuits. It enables size reduction of equipment if it is applied thereto. While the first embodiment applies a PFM method, the second embodiment uses a PWM technique to regulate two output voltages Vo1 and Vo2. With PWM, the process of controlling Vo1 and that of Vo2 are alternately executed. This nature simplifies the timing control circuit for T1 and T2, compared to that in the first embodiment. The second embodiment is more advantageous in terms of size reduction of electronic equipment.

The above discussion will now be summarized as follows. According to the present invention, the proposed bipolar supply voltage generator, as well as the proposed semiconductor device, is designed to use only a single inductor to produce both positive and negative supply voltages from a unipolar power source. It employs a first diode between the inductor and the positive voltage output, and a second diode between the inductor and the negative voltage output. The inductor is grounded through a first switch, while it is connected to a power source through a second switch. Those two switches are activated by a controller in an appropriate manner, so that the desired voltages will be produced. The proposed circuit supplies two voltages as in the conventional circuits, while eliminating one inductor. It is therefore suitable for small electronic appliances that need a bipolar power supply.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A bipolar supply voltage generator which produces a positive and negative supply voltages from a unipolar power source, comprising:
   an inductor;
   a first diode whose anode and cathode are connected to a first end of said inductor and a positive voltage output of said bipolar supply voltage generator, respectively;
   a second diode whose cathode and anode are connected to a second end of said inductor and a negative voltage output of said bipolar supply voltage generator, respectively;
   a first switch which connects the first end of said inductor to ground;
   a second switch which connects the second end of said inductor to the unipolar power source; and
   a controller which controls said first and second switches by modulating the pulse width with a fixed frequency, while turning off the first switch and the second switch at separate times and maintaining the first and second switches in an off state simultaneously for a time within one signal cycle every time prior to one of the first switch and the second switch being turned on.

2. The bipolar supply voltage generator according to claim 1, wherein:
said controller repeats a first process and a second process to produce the positive and negative supply voltages;
in the first process, said controller turns off said first switch upon expiration of a first turn-on period after turning on said first and second switches, whereby the positive output voltage is produced; and
in the second process, said controller turns off said second switch upon expiration of a second turn-on period after turning on said first and second switches, whereby the negative output voltage is produced.

3. The bipolar supply voltage generator according to claim 2, wherein:
in the first process, said controller also turns off said second switch when said inductor has released stored energy thereof, after having turned off said first switch; and
in the second process, said controller also turns off said first switch when said inductor has released stored energy thereof, after having turned off said second switch.

4. The bipolar supply voltage generator according to claim 2, wherein:
in the first process, said controller also turns off said second switch upon expiration of a predetermined time after having turned off said first switch;
in the second process, said controller also turns off said first switch upon expiration of the predetermined time after having turned off said second switch; and
the predetermined time is longer than a period of time that said inductor needs to finish releasing stored energy thereof in the first and second processes.

5. The bipolar supply voltage generator according to claim 2, wherein:
said controller, after having turned off said first switch in the first process, keeps said second switch turned on until the next second process starts; and
said controller, after having turned off said second switch in the second process, keeps said first switch turned on until the next first process starts.

6. The bipolar supply voltage generator according to claim 2, wherein:
the first turn-on period and second turn-on period are both fixed; and
said controller varies intervals of the first process and second process individually, thereby regulating the positive and negative supply voltages that are produced.

7. The bipolar supply voltage generator according to claim 2, wherein the first turn-on period agrees with the second turn-on period.

8. The bipolar supply voltage generator according to claim 2, wherein:
said controller repeats the first and second processes at fixed intervals; and
said controller varies the first turn-on period and second turn-on period individually, thereby regulating the positive and negative supply voltages that are produced.

9. The bipolar supply voltage generator according to claim 2, wherein said controller begins operation with the first process.

10. The bipolar supply voltage generator according to claim 2, wherein said controller begins operation with the second process.

11. A semiconductor device, for use with an external inductor coupled thereto, which produces a positive and negative supply voltages from a unipolar power source, the semiconductor device comprising:
an inductor;
a first diode whose anode and cathode are connected to a first end of said inductor and a positive voltage output of said bipolar supply voltage generator, respectively;
a second diode whose cathode and anode are connected to a second end of said inductor and a negative voltage output of said bipolar supply voltage generator, respectively;
a first switch which connects the first end of said inductor to ground;
a second switch which connects the second end of said inductor to the unipolar power source; and
a controller which controls said first and second switches by modulating the pulse width with a fixed frequency, while turning off the first switch and the second switch at separate times and maintaining the first and second switches in an off state simultaneously for a time within one signal cycle every time prior to one of the first switch and the second switch being turned on.

12. The semiconductor device according to claim 11, wherein:
said controller repeats a first process and a second process to produce the positive and negative supply voltages;
in the first process, said controller turns off said first switch upon expiration of a first turn-on period after turning on said first and second switches, whereby the positive output voltage is produced; and
in the second process, said controller turns off said second switch upon expiration of a second turn-on period after turning on said first and second switches, whereby the negative output voltage is produced.

13. The semiconductor device according to claim 12, wherein:
in the first process, said controller also turns off said second switch when the external inductor has released stored energy thereof, after having turned off said first switch; and
in the second process, said controller also turns off said first switch when the external inductor has released stored energy thereof, after having turned off said second switch.

14. The semiconductor device according to claim 12, wherein:
in the first process, said controller also turns off said second switch upon expiration of a predetermined time after having turned off said first switch;
in the second process, said controller also turns off said first switch upon expiration of the predetermined time after having turned off said second switch; and
the predetermined time is longer than a period of time that the external inductor needs to finish releasing stored energy thereof in the first and second processes.

15. The semiconductor device according to claim 12, wherein:
said controller, after having turned off said first switch in the first process, keeps said second switch turned on until the next second process starts; and
said controller, after having turned off said second switch in the second process, keeps said first switch turned on until the next first process starts.

16. The semiconductor device according to claim 12, wherein:
the first turn-on period and second turn-on period are both fixed; and
said controller varies intervals of the first process and second process individually, thereby regulating the positive and negative supply voltages that are produced.

17. The semiconductor device according to claim 12, wherein the first turn-on period agrees with the second turn-on period.

18. The semiconductor device according to claim 12, wherein:
said controller repeats the first and second processes at fixed intervals; and
said controller varies the first turn-on period and second turn-on period individually, thereby regulating the positive and negative supply voltages that are produced.

19. The bipolar supply voltage generator according to claim 1, wherein:
said controller turns off said first switch upon expiration of a first turn-on period after turning on the first switch and the second switch to produce the positive output voltage.

20. The bipolar supply voltage generator according to claim 1, wherein:
said controller turns off said second switch upon expiration of a second turn-on period after turning on the first switch and the second switch to produce the negative output voltage.

21. The semiconductor device according to claim 12, wherein:
said controller turns off said first switch upon expiration of a first turn-on period after turning on the first switch and the second switch to produce the positive output voltage.

22. The semiconductor device according to claim 12, wherein:
said controller turns off said second switch upon expiration of a second turn-on period after turning on the first switch and the second switch to produce the negative output voltage.

* * * * *

UNITED STATES PATENT AND TRADEMARK OFFICE
CERTIFICATE OF CORRECTION

PATENT NO. : 7,342,436 B2  
APPLICATION NO. : 10/316901  
DATED : March 11, 2008  
INVENTOR(S) : Chikara Tsuchiya et al.

Page 1 of 1

It is certified that error appears in the above-identified patent and that said Letters Patent is hereby corrected as shown below:

<u>Title Page</u> -

In (75) Inventors, please correct to read as follows:

-- (75)  Chikara TSUCHIYA, Kawasaki (JP);  
Kimitoshi NIRATSUKA, Kawasaki (JP);  
Eiji NISHIMORI, Kawasaki, (JP)  
Katsuyoshi OTSU, Kawasaki (JP) --

Signed and Sealed this

Nineteenth Day of August, 2008

JON W. DUDAS  
*Director of the United States Patent and Trademark Office*